United States Patent [19]

Urry

[11] 3,888,699
[45] June 10, 1975

[54] PRIMARY DRY CELL

[75] Inventor: Lewis F. Urry, North Olmsted, Ohio

[73] Assignee: Union Carbide Corporation, New York, N.Y.

[22] Filed: Aug. 27, 1973

[21] Appl. No.: 391,611

Related U.S. Application Data

[63] Continuation of Ser. No. 59,272, July 29, 1970, abandoned.

[52] U.S. Cl.............................. 136/107; 136/155
[51] Int. Cl. ....................................... H01m 21/00
[58] Field of Search ........... 136/107, 103, 138, 102, 136/155

[56] References Cited
UNITED STATES PATENTS

| | | | |
|---|---|---|---|
| 2,903,498 | 9/1959 | Sindel et al.......................... | 136/138 |
| 3,019,141 | 1/1962 | Priebl................................... | 136/155 |
| 3,060,256 | 10/1962 | Paulson............................... | 136/103 |
| 3,098,771 | 7/1963 | Huber................................... | 136/103 |
| 3,306,781 | 2/1967 | Siller.................................... | 136/138 |

Primary Examiner—John H. Mack
Assistant Examiner—C. F. Lefevour
Attorney, Agent, or Firm—J. R. Doherty

[57] ABSTRACT

Disclosed is a primary dry cell comprising a zinc anode, a cathode depolarizer mix cake containing manganese dioxide and a conductive material, and a separator interposed between the anode and cathode depolarizer mix cake, the cathode depolarizer mix cake being wetted with an inner electrolyte consisting essentially of an aqueous solution containing a metallic salt of a halogen-containing acid especially, though not exclusively, a zinc salt such as zinc chloride, the inner electrolyte constituting from about 60 to 71 percent by volume of the total cathode depolarizer mix cake.

3 Claims, 2 Drawing Figures

PATENTED JUN 10 1975  3,888,699
F I G. 1.
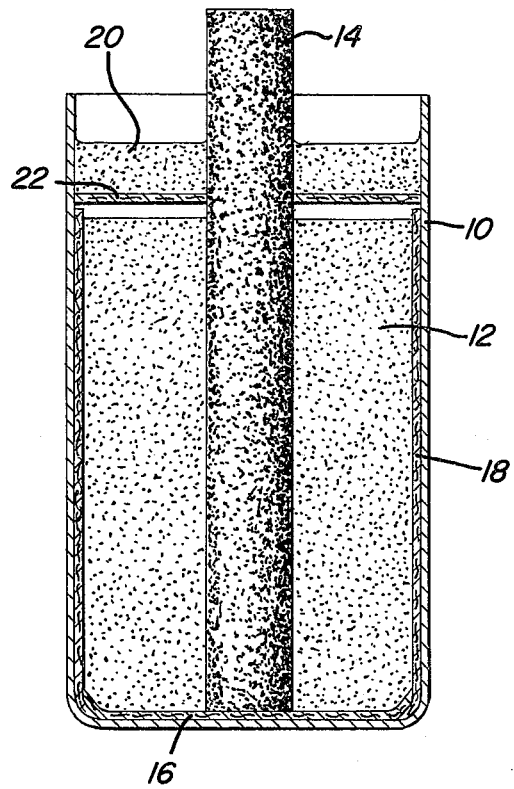
F I G. 2.
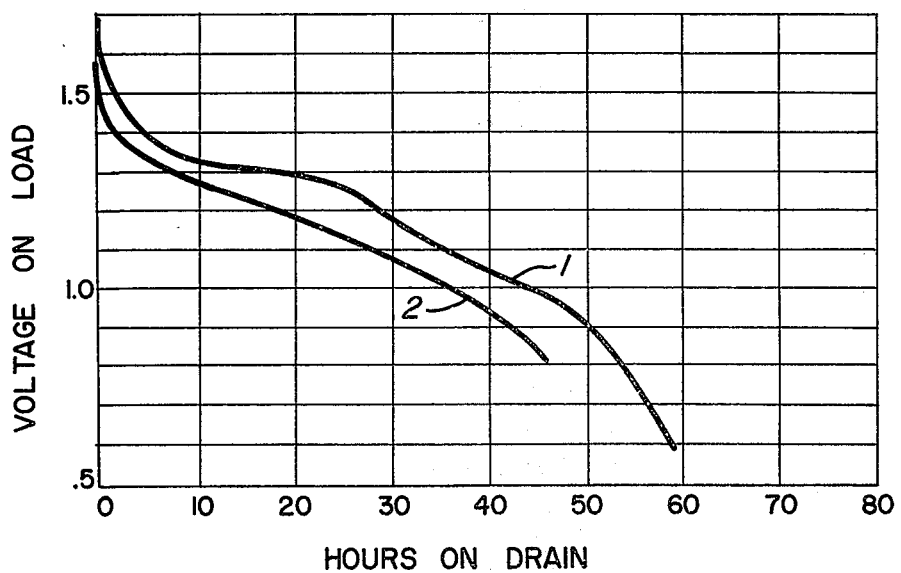
INVENTOR
Lewis F. Urry
BY John R. Doherty
ATTORNEY

PRIMARY DRY CELL

This is a continuation of application Ser. No. 59,272, filed July 29, 1970, now abandoned.

The present invention relates to improvements in primary dry cells. More particularly, the present invention relates to primary dry cells employing a zinc anode and an electrolyte consisting essentially of an aqueous solution containing a metallic salt of a halogen-containing acid especially, though not exclusively, a zinc salt such as zinc chloride.

Primary dry cells are composed essentially of a consumable metal anode, a cathode depolarizer usually manganese dioxide and an electrolyte.

The familiar Leclanche primary dry cell conventionally used as the power source in flashlights and other portable electric devices, comprises a zinc anode, a cathode depolarizer mix cake containing manganese dioxide and a conductive material such as carbon black or graphite, and an electrolyte consisting of an aqueous solution of zinc chloride and ammonium chloride (i.e. sal ammoniac). Various inhibitors such as mercuric chloride, chromates, etc. may also be used in relatively small amounts within the electrolyte.

Another type of primary dry cell which has attracted considerable attention in recent years is the magnesium dry cell. This dry cell system is very similar to the conventional Leclanche dry cell. Basically, the magnesium dry cell comprises a magnesium anode, a cathode depolarizer mix cake containing manganese dioxide and a conductive material and an electrolyte. The electrolyte consists essentially of an aqueous solution containing a magnesium salt such as magnesium chloride, magnesium perchlorate or magnesium bromide.

The magnesium dry cell offers a number of important advantages over the conventional Leclanche dry cell. Some of these advantages are (1) a higher working voltage of between about 1.5 and 1.6 volts, (2) a considerably higher service capacity, i.e. hours of service on discharge per unit of weight and volume, and (3) superior shelf life particularly at high temperature storage.

Despite these rather important advantages, however, there are a number of troublesome problems which have limited the more widespread commercial use of the magnesium dry cell. One of the more significant problems is the so-called "delay effect" encountered in the use of the magnesium dry cell. This phenomenon is manifested as a low starting voltage when the electrical load is applied, followed by a rise to the more normal discharge operating level. The delay may reach many seconds in length and may be explained as the time necessary to electrochemically disrupt the inhibitive film which normally protects the wetted surfaces of the magnesium from attack on open circuit.

Another problem encountered with the magnesium dry cell is that of gas generation. The magnesium dry cell when on discharge generates hydrogen copiously due to reactivity of the working magnesium anode with water. It is therefore necessary to use costly resealable mechanical vents which will vent the hydrogen gas formed on discharge and yet prevent loss of moisture and ingress of air on shelf storage. Of course, one of the major drawbacks of the magnesium dry cell lies in the fact that magnesium is an expensive raw material and consequently the manufacturing cost of the magnesium cell is high.

Most of the problems encountered with the magnesium dry cell can be attributed to the magnesium anode. It has now been found in accordance with the present invention that if a zinc anode is used instead of a magnesium anode with basically the same manganese dioxide cathode depolarizer mix cake and same type of electrolyte as employed in the magnesium dry cell, a primary dry cell system can be made which effectively circumvents these problems while at the same time retaining some important advantages of the magnesium dry cell. Such a primary dry cell system differs from the conventional Leclanche dry cell mainly in the absence of ammonium chloride from the electrolyte. In particular, this dry cell system has been found to possess a service capacity which is superior to that of the conventional Leclanche dry cell.

It has been proposed in the prior art to produce primary dry cells using a zinc anode and an aqueous zinc chloride electrolyte, however, these prior art cells differ significantly from those of the present invention in the formulation of the cathode depolarizer mix cake as will be explained hereinafter.

Accordingly, it is the principal object of the present invention to provide certain improvements in primary dry cells. More specifically, another object of the present invention is to provide a primary dry cell system which effectively circumvents the problems encountered with the magnesium dry cell while at the same time retaining some of its advantages. Still another object of the present invention is to provide a primary dry cell system having a high service capacity.

The foregoing and other objects and advantages are accomplished in accordance with the present invention by a primary dry cell system comprising a zinc anode, a cathode depolarizer mix cake containing a mixture of manganese dioxide and an electrolyte absorptive conductive material and an inner electrolyte consisting essentially of an aqueous solution containing a metallic salt of a halogen-containing acid especially, though not exclusively, a zinc salt such as zinc chloride, the inner electrolyte constituting from about 60 to 71 percent by volume of the total cathode depolarizer mix cake.

As used herein and in the appended claims, the term "inner electrolyte" is intended to denote the electrolyte normally incorporated within the cathode depolarizer mix cake. The term "outer electrolyte" as used herein and in the appended claims is intended to denote the electrolyte normally immobilized within the conventional separator interposed between the metal anode and cathode mix cake. As well understood by those skilled in the art, the outer electrolyte may be immobilized with a suitable gelatinizing agent such as flour or starch to form a conventional paste separator or the separator medium may be one of the conventional film separators such as carboxymethylcellulose coated paper thoroughly wetted with the outer electrolyte.

The present invention is predicated on the discovery which is an outgrowth of earlier experimental work with the magnesium dry cell, that a primary dry cell utilizing a zinc anode and an aqueous metallic halide or perchlorate salt electrolyte can be made having a high service capacity if the cathode mix formulation is devised using a high solution volume, i.e. percent by volume of inner electrolyte. In the case of a primary dry cell using an aqueous zinc chloride electrolyte, for example, it has been found that during the electrochemical process which takes place on discharge, water is consumed or tied up in the form of a zinc hydroxide reaction product. This reaction product in turn will react with the zinc chloride electrolyte to form a hard, dense material having the formula $ZnCl_2 \cdot 4Zn(OH)_2$. Because the cell does dry out on discharge, it has been found that the solution volume of the cathode depolarizer mix cake must be high enough to satisfy the above reaction and to insure electrolyte paths from the anode to cathode throughout the useful life of the cell.

In the practice of the present invention, the cathode depolarizer mix is made in the usual manner by first dry blending particles of manganese dioxide, finely-divided conductive material such as acetylene black and optionally, minor amounts of various inhibitors, such as mercuric chloride. Conventionally, this blend is then wetted with the inner electrolyte to produce a uniformly moistened mix of a consistency suitable for molding to the shape of the cathode mix cake.

It has now been found in accordance with the present invention that if the cathode mix formula is devised using a high solution volume of between about 60 and 71 percent, a moldable mix of suitable consistency for forming the cathode depolarizer mix cake can be made which contains enough inner electrolyte to insure full service delivery.

In attaining this high solution volume, a number of related factors must be taken into account in devising the cathode mix formula. The ratio of manganese dioxide ore to carbon black, for example, should be fairly high in order to maintain the cell depolarization discharge capacity although a substantial percentage of the very highly absorbent carbon black is required in order to incorporate sufficient electrolyte. Ideally, it has been found that the ratio of manganese dioxide ore to carbon black should be maintained in the range of from about 4:1 to 9:1.

The concentration of the electrolyte solution is another related factor. It has been found, for example, that a dry cell using a 6.0 normal solution of zinc chloride in water exhibits a slightly higher service capacity than a cell using a 9.8 normal electrolyte solution. This is believed due to the higher water content of the less concentrated electrolyte solution.

Besides the aqueous zinc chloride electrolyte mentioned, electrolytes using several other salts are also useful in the practice of the present invention. It is possible, for example, to employ the same electrolyte solutions as used in the magnesium dry cell, i.e. magnesium chloride, magnesium perchlorate and magnesium bromide. Preferably, however, the halogen-containing salt used in the electrolyte is a zinc salt such as zinc perchlorate and zinc bromide as well as zinc chloride. The use of the zinc salt is preferred because it is more compatible with the zinc anode and thus anode corrosion problems are avoided.

The present invention will now be described in greater detail in the following description of a specific embodiment thereof, taken in conjunction with the accompanying drawing wherein:

FIG. 1 is a vertical section of a primary dry cell embodying the present invention; and FIG. 2 is a graph showing comparative discharge voltage curves.

Referring now to FIG. 1, there is shown a cylindrical primary dry cell comprising a zinc cup or can 10 containing the cathode depolarizer mix cake 12 which is molded in the usual manner around a central carbon electrode rod 14 to form a conventional cathode bobbin. The cathode bobbin rests on a paper washer 16 in the bottom of the zinc cup or can 10 and is separated from the side walls of the zinc cup or can 10 by a thin film separator 18 such as carboxymethylcellulose coated paper or a methylcellulose separator. The dry cell is provided with a top seal 20 which may be made of wax or pitch poured onto the top of the bobbin washer 22 within the open end of the zinc cup or can 10.

The thin film separator 18 is thoroughly wetted with the outer electrolyte which may be a concentrated solution of zinc chloride in water. Usually, the outer electrolyte is the same concentration as the inner electrolyte, e.g. 6.0 normal zinc chloride.

The following example will serve to illustrate the practice of the present invention.

A number of "AA" size primary dry cells were made using a zinc cup anode and an aqueous zinc chloride electrolyte, the construction of the cells being basically the same as that shown in FIG. 1. The cathode depolarizer mix cakes for each of the cells were molded from an electrolyte wetted mix prepared in the manner as described above and having the following formulation:

| Cathode Mix Ingredients | % by Weight | % by Volume at 70°F. |
|---|---|---|
| Artificial $MnO_2$ | 55.6 | 26.6 |
| Acetylene black | 6.4 | 8.0 |
| $Zn(OH)_2$ (powder) | 0.8 | 0.6 |
| 6.0 N $ZnCl_2$ solution | 37.2 | 64.8 |
| Total | 100.0 | 100.0 |

The cathode depolarizer mix cake made with this formulation had approximately a 65 percent solution volume. The ratio of manganese dioxide ore to acetylene black in the formulation was 8.7:1. The real density of the wetted mix was 2.285 grams per cubic centimeter and the weight ratio of water in the electrolyte wetted mix to manganese dioxide ore in the mix was 0.460:1. This provided 1.65 grams of water per ampere hour of manganese dioxide theoretical capacity.

The cells made in the above example used a methylcellulose separator and the outer electrolyte was a 6.0 normal solution of zinc chloride in water.

The two curves shown in the graph of FIG. 2 illustrate the advantage in improved service capacity of primary dry cells made in accordance with the present invention. Curve 1 represents the continuous discharge of the "AA" size cells made in the above example on a 72 ohm load at 75°F. Curve 2 represents the discharge of a typical prior art Leclanche dry cell under the same drain conditions. It will be seen that the primary dry cells of the present invention exhibit a higher working voltage than the conventional Leclanche dry cells and that this voltage is sustained for a longer period of time. From these tests then, it is evident that the primary dry cells of the present invention possess a high service capacity.

What is claimed is:

1. A primary dry cell comprising a zinc anode, a cathode depolarizer mix cake containing manganese dioxide, a conductive material and an inner electrolyte consisting essentially of an aqueous zinc perchlorate solution, and a separator interposed between said anode and said cathode depolarizer mix cake, said inner electrolyte constituting from about 60 to 71 percent by volume of the total cathode depolarizer mix cake.

2. A primary dry cell as defined by claim 1 wherein the cathode depolarizer mix cake contains manganese dioxide and carbon black in a ratio of from about 4:1 to about 9:1.

3. A primary dry cell as defined by claim 1 wherein the separator contains an outer electrolyte consisting essentially of an aqueous zinc perchlorate solution.

* * * * *